3,112,283
MOLDING COMPOSITION COMPRISING UNSATURATED MONOMER MODIFIED POLYESTER AND FILLER
Andre M. Hansen, Farmington, Mich., and Joseph N. Epel, 4325 Leslie, Detroit, Mich.; said Hansen assignor to Chrysler Corporation, Highland Park, Mich., a corporation of Delaware
No Drawing. Filed Sept. 10, 1959, Ser. No. 839,073
2 Claims. (Cl. 260—17.4)

This invention relates to resin molding compositions or pre-mixes, especially of the thermosetting type, for producing molded products therefrom possessing significantly low sound transmitting properties.

More particularly, the invention pertains to molded resin structures and articles suitable for automotive housing and duct applications and the like which provide in addition to resilientcy, toughness and shock resistance, unique sound barrier properties obviating the need for supplementary glass fiber or synthetic resin foam types of sound barrier materials heretofore considered necessary in assembly to obtain satisfactory blocking of undesirable noise.

Conventional molding compositions herefore used to form structures of the above character, such as housing, ducts, passageways, containers, automotive body sections, and the like are usually made from resin molding compositions containing approximately 22% to 35% and more by weight of resin, with the remainder made up of selective fillers from fibrous material such as asbestos fiber, glass fiber, wood fiber and sisal fiber, and particle materials such as silica, zinc oxide, kaolin, china clay, dolomite, ground wood pulp, natural and synthetic resinous particles, talc, calcium stearate and the like, the greater part of these fibers and fillers having specific gravities between 1 and 2.60 but none greater than 2.95. These conventional compositions sometimes include minor amounts usualy less than 1% by weight of the composition, of iron oxide (black) as a colorant and lead compounds such as lead sulfate or lead stearate in amounts up to about 5% by weight of the resin constituent, for improving the electrical and thermal properties of the composition. Insofar as we are aware in no case have the molded products made by these compositions produced structures having a specific gravity in excess of about 2.1.

When these conventional molded products have heretofore been employed, for example for automotive applications, in places such as heater housings where the inhibiting of sound transmission is important from the standpoint of the passengers in the vehicle, it has been necessary to utilize in addition to the molded material per se additional sound barrier materials such as fiberglass and resin or rubber foams to reduce the noise transmission into the passenger compartment to acceptable levels. The need to resort to such methods for attaining satisfactory results have been both troublesome and costly.

We have discovered that the sound inhibiting properties of conventional molded products of the types heretofore employed for uses such as described above may be materially enhanced and in fact so improved that the molded material may serve as an efficient and satisfactory sound or noise barrier without the need for the supplementary sound barrier materials and structures referred to above heretofore deemed essential to reduce noise levels to a satisfactory level.

In particular, we have discovered that when the filler material employed in the resin compositions includes a sufficient amount, at least about 45% by weight of the composition, of high density ingredients (hereinafter sometimes referred to as density controlling ingredients) of a specific gravity of 4.2 and greater so as to produce a molded product having a specific gravity of at least about 2.75, that the sound or noise inhibiting properties of the molded product are maximized. Of the many compositions we have tested we have found that a specific gravity of about 2.9 to 3.3 in the finished product appears to provide maximum inhibiting of sound or noise transmission. The upper limit of specific gravity we can employ will be governed by the character of resin binder and fillers used in the composition. For presently available filler materials a specific gravity in the finished product of about 4.0 appears maximum for the desired results.

We have further discovered that the efficiency of the molded products of our invention in inhibiting the transmissibility of sound or noise is to some extent affected by the molecular structure and the physical character, such as hardness, toughness, and flexural modulus of the resins employed in the molding composition and by the relative particle size of the density controlling fillers. Thus, for example, we find that the resins in the medium flexural modulus range give best results. If the resin binder used in the composition is a relatively soft material when set and cured, the low frequency sound inhibiting efficiency of the molded product will be somewhat reduced from that of the relatively harder resinous material while a relatively hard resin will somewhat lower the sound barrier efficiency at nearly all audible sound frequencies, especially those in the higher range. Similarly, the finer the average particle size of the density controlling ingredients the more efficient will be the sound transmissibility inhibiting effectiveness of the product. For example, a No. 325 grit material will exhibit greater sound barrier properties in the audible range of frequencies of between 75 to 4800 cycles per second than a corresponding composition employing a No. 200 grit filler material.

In general, our experience has indicated that a resin binder having a flexural modulus range between 270,000 to 600,000 p.s.i. in combination with the essential density controlling filler ingredients will provide optimum effectiveness against sound or noise transmissibility. Especially desirable are the unsaturated polyester resins of polyhydric alcohol and a polybasic acid combined with an unsaturated monomer.

A principal object of our invention is accordingly to provide a satisfactory commercial resin molding composition containing sufficient high density filler materials adapted to produce a molded product highly effective against the transmissibility of noise or sound when used in a single molded layer so as not to require the buffering action of supplementary sound barrier materials in installations using such molded products.

Another object is to provide a molding composition as in the preceding object which has a relatively high specific gravity as compared to the conventional molding compositions employed for applications such as described above and which will produce cured molded products having the resiliency, toughness, and shock resistance comparable to that obtained in field performance with similar products molded from conventional compositions.

A further object is to provide molding compositions of the foregoing character which possess good moldability and preferably fast molding properties and which may be molded into a wide variation of shapes and sizes for application such as described above, for example heating ducts and passageways.

A specific object is to provide a thermosetting resin-filler molding composition of generally homogeneous character having when molded the essential physical relationship between resin binder and filler conducive to the efficient retarding and/or inhibiting of sound and noise transmissions therethrough and possessing adequate resiliency, toughness, and shock resistance productive of a suitable and serviceable product.

Another specific object is to produce a composition and molded product as in the preceding objects wherein the resiliency of the product as provided by the resin binder is such as to enhance the ability of the product to inhibit the transmissibility of undesirable sound and noise therethrough.

Other objects and advantages of our invention will become apparent from the foregoing and following description of the more specific aspects thereof.

In accordance with the present invention it has been discovered that if a sufficient quantity, at least about 45% by weight of the composition, of density controlling ingredients of a specific gravity of at least about 4.2 are included in the fillers employed in the resin molding compositions of our invention it is possible to produce molded products not only having satisfactory structural properties but having exceptionally low sound and noise transmitting properties such that a single layer of the molded product will perform the functions heretofore impossible of attainment by conventional molded products without the use of supplementary sound barrier materials. Such particles may be used in amount up to about 86% by weight of the composition depending upon the types of particle and other ingredients used and the overall specific gravity desired. In most cases the percentages will for optimum results run between about 55% to 75% by weight of the composition. The unique molded products of the invention as thus compounded will have a relatively high density corresponding to a specific gravity of about 2.75 up to about 4.0 with those in the range of about 2.9 to about 3.3 providing the optimum reduction in sound transmissibility.

By way of illustrating the efficacy of our invention it is found that a typical molded product used for an automotive heater housing and containing 36% by weight of a polymerizable resin, 51% asbestos fiber, 11% sisal fiber, 1% zinc stearate, and ½% iron oxide and having a specific gravity of about 1.65 gave, when tested for sound transmissibility, a value in total loudness units (sones) of 38.0 for the frequency range of 75 to 2400 cycles per second, and a value of 52.0 for the frequency range of 75 to 4800 cycles per second, whereas products made by the present invention for heater housing and which eliminate the need for supplementary sound barrier material gave values as low as 28.0 and lower for the frequency range of 75 to 2400 cycles per second and a value of 36 or less for the frequency range of 75 to 4800 cycles per second, it being noted in this connection that the lower the value in total loudness units in these ranges the more efficient the material is considered against sound transmission.

Various particulate metals and the heavy salts of metal such as the salts of alkaline earth metals, relatively insoluble in the resin binders of our compositions, may be used as the density controlling components in the compositions of our invention to obtain the unique results described and each will have a specific gravity of 4.2 and greater up to about 12.0. Typical examples are iron particles such as powdered iron, and oxides of iron such as magnetite and hematite; lead dust; powdered tin; powdered nickel; powdered zinc; powdered copper; lead sulfate; basic lead carbonate; barium sulfate; barium carbonate; and combinations of any of the foregoing. Lowest cost products will be made employing the iron particles and metal salts. Moreover, it has been found that barium sulfate alone or this salt in combination with powdered iron are particularly desirable as the high density components of the material, such ingredients being especially effective when used with the unsaturated polyester resin binder compositions hereinafter described and also referred to in the examples given.

As previously noted, the size of the density controlling particles has some affect on the ultimate sound transmissibility of the molded product, the finer particles giving better results than coarser ones. The employment of high density particles in a particle size between 80–360 mesh or as grit mixtures thereof will facilitate the obtaining of a strong, molded resin filler product free of substantial porosity. Particle sizes in the range of 200–360 mesh are preferred. In the case of iron particles we have found it expedient in the interest of cost to employ so called iron grit, a waste product of shot-blasting processes, which instead of being a close mesh size is sold according to grit numbers, for instance Nos. 200 and 325 the first being a mixture of sizes finer than 80 mesh and No. 325 being a mixture of sizes finer than 120 mesh as set out in the SAE standards therefor. The metal salts usually are obtained in a size of 5 to 25 microns.

In addition to the high density controlling particle ingredients the filler of our molded composition will include a minor proportion of reinforcing fibrous material in amount between about 4% to 16%, preferably under 6% to use maximum amounts of density controlling ingredients. Such reinforcing fibrous material may include organic and inorganic reinforcing fibers such as sisal, fiberglass, asbestos fiber and synthetic resin fibers such as Dacron and nylon and/or any other natural or synthetic fibers. The presence of this reinforcing fibrous material will increase the strength of the molded product and the resistance of the molded product to mechanical impact.

The novel composition of our invention may also include other filler material to the extent made possible by the volumetric needs of the high density controlling materials, resin and reinforcing fiber. Examples of these are asbestos floats desirably used to not only improve the physical properties of the molded product but also to impart flowability to the molding composition during molding operations and the metallic stearates such as zinc, calcium, barium, magnesium or aluminum stearate, these being especially useful for aiding in separation of the finished product from the mold surface and being preferred to other known conventional mold surface treatments heretofore employed. The asbestos floats may be used in substantial amount up to about 30% by weight of the composition and the stearate in minor amounts generally less than 1% by weight of the composition for the purposes indicated.

Various resin binder compositions may desirably be employed in the molding composition and products of our invention including both thermosetting and thermoplastic resins for example, polyesters, modified phenolics, epoxides, polyvinyl chlorides, and linear polyethylenes and polypropylenes preferably the thermosetting types so long as they are suitable for molding operations. The resins we may use will preferably provide suitable resiliency in the final molded product to enhance its efficiency as a sound or noise barrier and to enhance the physical performance of the products against cracking and other failures. Resins having a relatively low flexural modulus in the range of 270,000 to 600,000 p.s.i. should give desirable properties.

In our work with the molding compositions of this invention we have particularly found that the resin most desirable for the sound inhibiting properties desired in the finished product are the alkyd resins of the class known as polymerizable unsaturated polyester resins employed in conjunction and/or solution with polymerizable unsaturated monomers. Such a resin will form a copolymer of the polyester and monomer during heat curing of the molding composition to provide cured products therefrom possessing excellent flexural toughness and ability to absorb shock. The resin per se will give to the molding composition especially good moldability and the molded product a high hot strength to enable it to be pulled from the hot mold without distortion.

The amount of resin binder essential to use by weight of the composition in the molding composition will vary somewhat with the character of high density materials employed. However, far less of such binder is necessary on a weight basis in the product of our invention than those conventionally employed in resin molding compositions heretofore known. In our work we have found that for best results the amount of resin binder should not exceed about 17% by weight of the molding composition and that a minimum of about 10% by weight of the composition will be required in all cases. Stated in terms of volumetric requirements the resin component should constitute between 30% to 50% by volume of the composition.

The polymerizable unsaturated polyester resins we prefer to use are the polymerizable, unsaturated polycarboxylic acid-polyhydric alcohol polyester resins which are the reaction products of polyhydric alcohols, mixtures of polyhydric alcohols or mixtures of polyhydric and monohydric alcohols such as ethylene glycol, propylene glycol, butylene glycol, glycerine and bisphenol A glycol, and a polybasic acid such as aliphatic unsaturated polycarboxylic acid or a plurality of polycarboxylic and monocarboxylic acids one of which is an unsaturated polycarboxylic acid such as unsaturated dibasic acids such as maleic, fumaric, itaconic, cetraconic, and mesaconic acids preferably in conjunction with a saturated dibasic acid such as adipic, sebasic and azelic acids or phthalic anhydride, the reaction being made in the presence of a suitable polymerization inhibitor such as hydroquinone or tertiary butyl catechol to produce a polyester resin of the desired degree of esterification and acid number.

A typical polyester resin of the above character may be prepared by known procedures in a reactor by:

(1) Reacting together substantially equal mols of maleic anhydride and dipropylene glycol and a small amount about 0.2% by weight of the reactants of tertiary butyl catechol.

After the reaction has proceeded to the desired viscosity the reactant is cooled.

(2) Reacting together substantially equal mols of fumaric acid and dipropylene glycol and a small amount about 0.2% by weight of the reactants of tertiary butyl catechol.

After the reaction has proceeded to the desired viscosity the reactant is cooled.

(3) Reacting together substantially two mols of diethylene glycol, one mol of maleic anhydride, and one mol of adipic acid and a small amount of tertiary butyl catchol.

After the reaction has proceeded to the desired viscosity the reactant is cooled.

These polyester resins are as above indicated desirably blended with other unsaturated components such as polymerizable monomer liquids, for example styrene, diallyl phthalate, vinyl toluene or methyl methacrylate by dissolving the polyester in the reactive diluent.

A typical solution of polyester in an unsaturated monomer of the foregoing character may be made as follows:

(4) Dissolve a polyester resin as prepared in Formula 1 in a diluent consisting of styrene in amount to yield a solution having a viscosity of 2500 to 3000 centipoise containing 25% to 30% by weight of monomer and 70% to 75% by weight of polyester resin.

(5) Dissolve a polyester resin as prepared in Formula 1 in a reactive diluent consisting of vinyl toluene monomer in amount to yield a solution having a viscosity of 2500 to 3000 centipoise containing 25% to 30% by weight of monomer and 70% to 75% by weight of polyester resin.

(6) Dissolve a polyester resin as prepared in Formula 2 in a reactive diluent consisting of styrene in amount to yield a solution having a viscosity of 2500 to 3000 centipoise containing 25% to 30% by weight of monomer and 70% to 75% by weight of polyester resin.

(7) Dissolve a polyester resin as prepared by Formula 2 in a reactive diluent consisting of vinyl toluene monomer in amount to yield a product having a viscosity of 2500 to 3000 centipoise containing 25% to 30% by weight of monomer and 70% to 75% by weight of polyester resin.

(8) Dissolve a polyester resin as prepared in Formula 3 in styrene monomer in amount to yield a solution having a viscosity of 2700 to 3200 centipoise and containing 25% to 30% by weight of styrene monomer and 70% to 75% by weight of polyester resin.

Other typical examples of unsaturated polyesters and solutions of unsaturated polyester resins and unsaturated liquid monomers adapted to form a copolymer of a polyester and monomer upon curing may be found in the patents to Minter et al. 2,840,538, Blegan et al. 2,809,946, Anderson et al. 2,757,160, Dearing et al. 2,623,025, Schollick et al. 2,857,359, and Johnston et al. 2,861,910. Examples of solutions of unsaturated polyester resins in liquid monomers of the above character obtainable commercially are "Selectron 5140," a product of Pittsburgh Plate Glass Company; "Paraplex P47," a product of Rohm & Haas Corporation; and "Plyophene 8180," a product of Reichold Chemical Corporation.

The following are typical examples of molding compositions prepared in accordance with the teachings of our invention, all parts and percentages given being by weight of the total composition. Where sound test results are given the values are in total loudness units (sones). Such values are obtained by placing a panel 12" x 12" of 0.120" thickness molded from the composition, intermediate two closed chambers having non-parallel sides, each chamber being provided with an opening arranged on the opposite sides of the panel and coaxial with each other through which openings sound may be transmitted from one chamber through the panel into the second chamber. A noise equivalent to 100 decibels is generated in the initiating chamber on one side of the test panel and the noise passing through the sample is picked up in the second chamber by a sensitive pickup device located therein, the amount of which noise is registered in decibels. A plurality of readings are taken at different frequencies at 5 points in the frequency range of 75 to 2400 cycles per second, and 7 points in the frequency range of 75 to 4800 cycles per second, and a summation is made of the differences (corrected by table to listening values in sones) between the pickup value and 100 for each of the points in each range for which a reading is taken. These sums represent the total loudness value (sones).

Molded products were prepared from compositions in the examples under conditions of temperature and pressure employed in connection with molding of conventional reinforced molding compositions. Such practices cover pressures of 200 to 1000 lbs. per sq. in. temperatures of 250° F. to 325° F., and curing times of 35 seconds to 120 seconds. The compositions were initially prepared to provide a uniform distribution of the components. The thermosetting reaction of the polyester solution binder material in each example was catalyzed by the addition of a sufficient amount usually between 1% to 2% by weight of the polyester composition of suitable organic catalysts for example a peroxide catalyst such as benzoyl peroxide, tertiary butyl perbenzoate, or a hydroperoxide catalyst such as cumene hydroperoxide.

Example I 1000 parts by weight iron powder (No. 325 grit)
425 parts by weight asbestos floats
13 parts by weight zinc stearate
100 parts by weight sisal fiber chopped to ¼" length
260 parts by weight of polyester resin solution in accordance with Formula #5
2 parts by weight benzoyl peroxide The composition was prepared by conventional methods and molded at 275° F. under a pressure of 600 lbs. per sq. in. and with a curing time of 45 to 60 seconds. The molded composition had a specific gravity of 3.03. Panels 0.120" thick tested in the frequency ranges of 75 to 2400 c.p.s. and 75 to 4800 c.p.s. as described above, gave values in total loudness units of 29 and 37 respectively. As compared to conventional molded products this panel had significantly low sound transmissability properties.

Example II 500 parts by weight iron powder (No. 200 grit)
1000 parts by weight barium sulfate (10 micron size)
300 parts by weight asbestos floats
13 parts by weight zinc stearate
100 parts by weight sisal fiber chopped to ¼" average length.
260 parts by weight polyester resin solution in accordance with Formula #5
2 parts by weight of benzoyl peroxide The composition was prepared by conventional methods and molded at a temperature of 275° F. under a pressure of 600 lbs. per sq. in. and with a curing time of 45 to 60 seconds. The molded product had a specific gravity of 3.00. Panels 0.120" thick tested for noise transmissibility as described above in the frequency ranges of 75 to 2400 c.p.s. and 75 to 4800 c.p.s. gave values in total loudness units of 26 and 36 respectively.

Example III 1250 parts by weight of barium sulfate
100 parts by weight of asbestos floats
10 parts by weight of zinc stearate
80 parts by weight of sisal fiber
260 parts by weight of polyester resin solution in accordance with Formula #5
2 parts by weight of benzoyl peroxide The composition was prepared by conventional methods and molded at 275° F. under a pressure of 600 lbs. per sq. in. and with a curing time of 45 to 60 seconds. The molded product had a specific gravity of 2.86. Panels 0.120" thick made of this composition and tested for noise transmissibility as described above in the frequency ranges of 75 to 2400 c.p.s. and 75 to 4800 c.p.s. gave values in total loudness units of 35 and 45 respectively. These values, while not as good as those obtained with Examples I and II are exceedingly better than those possible with conventional molding compositions.

Example IV 1200 parts by weight of barium sulfate
200 parts by weight of iron powder (No. 200 grit)
150 parts by weight of asbestos floats
10 parts by weight of zinc stearate
80 parts by weight of sisal fiber
270 parts by weight of polyester resin solution in accordance with Formula #5
2 parts by weight of benzoyl peroxide The composition was prepared by conventional methods and molded at a temperature of 275° F. under a pressure of 600 lbs. per sq. in. with a curing time of 45 to 60 seconds. The molded product had a specific gravity of 2.94. Molded panels 0.120" thick of this composition tested for noise transmissibility as described above in the frequency ranges of 75 to 2400 c.p.s. and 75 to 4800 c.p.s. gave values in total loudness units of 28 and 34 respectively. Some of the best results were obtained with this composition in field operations.

Example V 1000 parts by weight of iron powder (No. 325 grit)
190 parts by weight of asbestos floats
13 parts by weight of zinc stearate
100 parts by weight of glass fibers
260 parts by weight of polyester resin solution in accordance with Formula #5
2 parts by weight of benzoyl peroxide The composition was prepared by conventional methods and molded at 275° F. under a pressure of 600 lbs. sq. in. with a curing time of 45 to 60 seconds. The molded product had a specific gravity of 3.26. It exhibited excellent low sound transmissibility properties.

In all the foregoing examples the fiber components such as sisal fiber, asbestos fiber, and glass fiber were of a relatively small size in the order of ¼" and the particulate density controlling ingredients were in the order of No. 200 grit and finer in size.

It will be understood that other density controlling components may be substituted for those recited in the specific examples with satisfactory results. Also that the non-density controlling fillers in the compositions may be replaced by equal volumes of other fillers of such type. For example, Dacron and nylon fibers may be substituted for sisal or glass fibers. Also, other stearates such as calcium stearate, barium stearate, magnesium stearate or aluminum stearate may be substituted for the zinc stearate. In fact, these internal lubricants may be omitted and the mold surfaces treated by other conventional means.

Furthermore, any of the solutions of polyester resins and unsaturated monomers of Formulas 4, 6, 7 and 8 may be substituted for that of Formula #5 of the above examples with satisfactory results. In addition, instead of employing the combined polyester resins and monomers in accordance with Formulas 5 to 8 inclusive, the unsaturated polyester resins may be employed in the form of Formulas 1, 2 and 3 and the unsaturated monomers of Formulas 4 to 8 added to the polyester resin in the amounts indicated in these formulas, as independent components, at the time of preparing the composition together with an organic peroxide catalyst in amount shown in the examples to effect the final cure.

From the foregoing description of our invention it will be apparent that we have presented unique resin molding compositions adapted for many structural and other applications where inexpensive, strong, molded resin products are desired which are adapted to provide in a single layer excellent noise barriers without the need or use of supplementary noise barrier materials.

It will be understood that various changes and modifications may be made by those skilled in the art employing the above teachings and without departing from the principles and spirit of the invention set forth above.

The present application is a continuation-in-part of our copending application Serial No. 738,999 filed June 2, 1958, now abandoned.

We claim:

1. A thermosetting molding composition for producing products of relatively low noise transmissibility properties comprising essentially by weight:

About 500 parts iron powder
About 1000 parts barium sulfate
About 13 parts metallic stearate
About 300 parts asbestos floats
About 260 parts polymerizable unsaturated polycarboxylic acid-polyhydric alcohol polyester in solution in a polymerizable unsaturated monomer
About 2 parts organic peroxide catalyst
About 100 parts sisal fiber.

2. A thermosetting molding composition for producing products of relatively low noise transmissibility properties comprising essentially by weight:

About 1200 parts barium sulfate
About 200 parts iron powder
About 150 parts asbestos floats
About 10 parts metallic stearate
About 270 parts polymerizable unsaturated polycarboxylic acid-polyhydric alcohol polyester in solution in a polymerizable unsaturated monomer
About 2 parts organic peroxide catalyst
About 80 parts sisal fiber.

References Cited in the file of this patent

UNITED STATES PATENTS

| | | |
|---|---|---|
| 2,288,321 | Nordlander et al. | June 30, 1942 |
| 2,695,425 | Stott | Nov. 30, 1954 |
| 2,698,232 | Golibersuch | Dec. 28, 1954 |
| 2,840,538 | Minter et al. | June 24, 1958 |
| 2,845,660 | Peiler | Aug. 5, 1958 |
| 2,857,359 | Schollick et al. | Oct. 21, 1958 |